(12) United States Patent
Schlichting et al.

(10) Patent No.: US 7,858,212 B2
(45) Date of Patent: Dec. 28, 2010

(54) DISPERSION STRENGTHENED RARE EARTH STABILIZED ZIRCONIA

(75) Inventors: Kevin W. Schlichting, Storrs, CT (US); Paul H. Zajchowski, Enfield, CT (US); Susan Manning Meier, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 791 days.

(21) Appl. No.: 11/158,946

(22) Filed: Jun. 21, 2005

(65) Prior Publication Data

US 2006/0024513 A1    Feb. 2, 2006

Related U.S. Application Data

(63) Continuation-in-part of application No. 10/903,166, filed on Jul. 30, 2004.

(51) Int. Cl.
B32B 9/00 (2006.01)
(52) U.S. Cl. .................................................. 428/698
(58) Field of Classification Search ............... 428/701, 428/698, 446
See application file for complete search history.

(56) References Cited

U.S. PATENT DOCUMENTS

| | | | |
|---|---|---|---|
| 4,996,117 A * | 2/1991 | Chu et al. ................ | 428/633 |
| 5,059,095 A | 10/1991 | Kushner et al. | |
| 5,780,171 A | 7/1998 | Nissley et al. | |
| 6,177,200 B1 * | 1/2001 | Maloney .................. | 428/472 |
| 6,835,465 B2 * | 12/2004 | Allen et al. ............... | 428/632 |
| 2003/0008764 A1 | 1/2003 | Wang et al. | |
| 2003/0059633 A1 * | 3/2003 | Ackerman et al. ........ | 428/472 |

FOREIGN PATENT DOCUMENTS

CN        1398172 A        2/2003

OTHER PUBLICATIONS

A. Tsoga, A. Naoumidis et al: "processing and characterization of fina crystalline ceria-gadolinia-yttria stabilized zirconia powders" Journal of the European Ceramic Society, vol. 19, No. 6-7, Jun. 1999, pp. 907-912, XP002385883.
Zhu D et al: "Defect Clustering and Nano-Phase Structure Characterization of Multi-Component Rare Earth Oxide Doped Zirconia Yttria Thermal Barrier Coatings" Ceramic Engineeri.
English Abstract for CN 1398172 pulled from esp@cenet Jul. 23, 2008.

* cited by examiner

Primary Examiner—David R Sample
Assistant Examiner—Daniel Miller
(74) Attorney, Agent, or Firm—Bachman & LaPointe, P.C.

(57) ABSTRACT

A process for forming a coating on a substrate, such as a turbine engine component, is provided. The process comprises the steps of providing a rare earth oxide stabilized zirconia composition, blending the first rare earth oxide stabilized zirconia composition with at least one additional constituent selected from the group consisting of $TiO_2$, $Al_2O_3$, a blend of $Al_2O_3$—$TiO_2$, $La_2Zr_2O_7$, and 20 wt % Yttria Stabilized Zirconia; and depositing the blended powder onto the substrate. Articles having the coating formed from the above process are also described.

15 Claims, 2 Drawing Sheets

FIG. 1

US 7,858,212 B2

DISPERSION STRENGTHENED RARE EARTH STABILIZED ZIRCONIA

CROSS REFERENCE TO RELATED APPLICATION(S)

Figure 2:
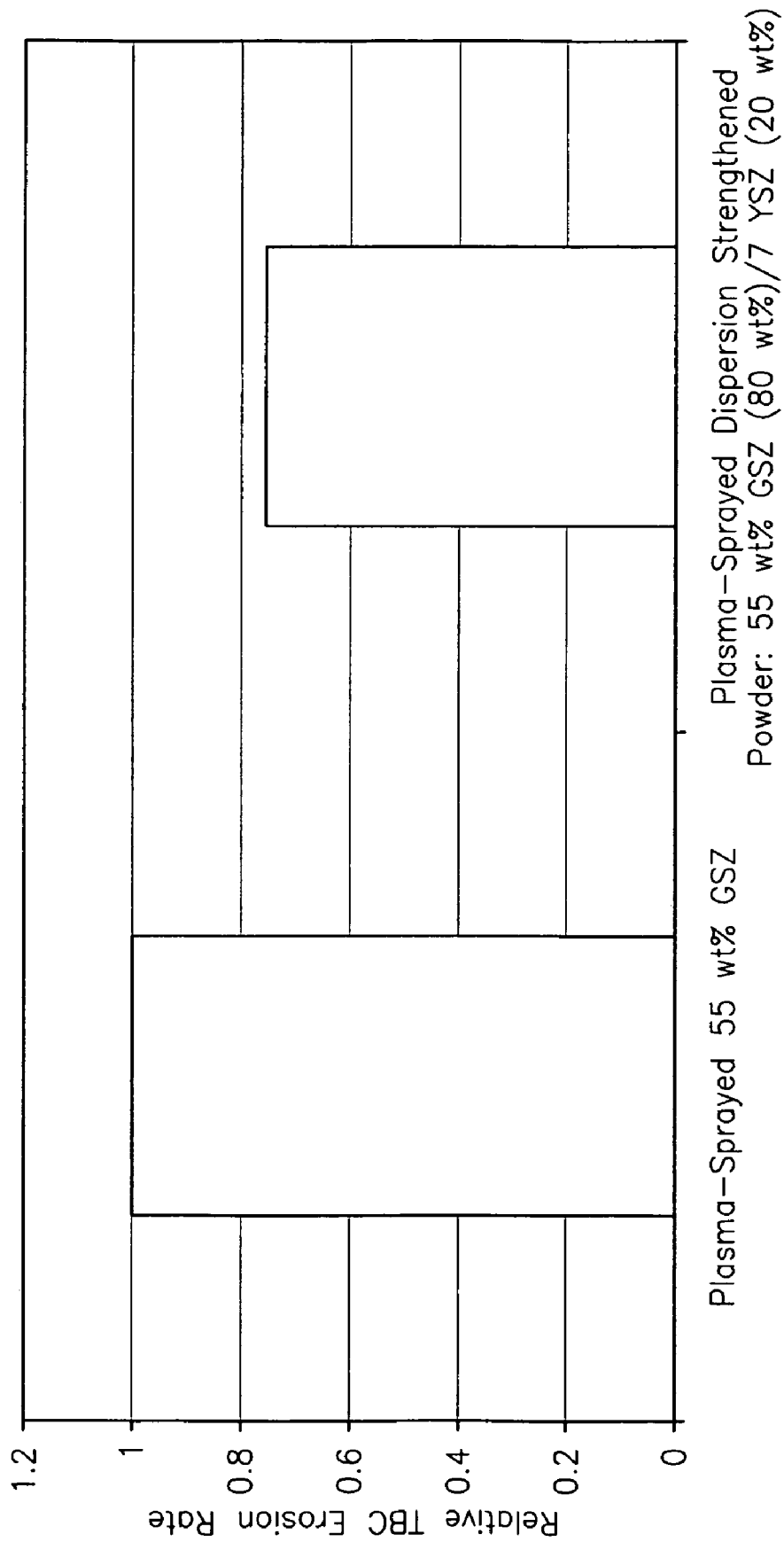

The instant application is a continuation-in-part application of U.S. Ser. No. 10/903,166, filed on Jul. 30, 2004, entitled DISPERSION STRENGTHENED RARE EARTH STABILIZED ZIRCONIA.

BACKGROUND OF THE INVENTION (1) Field of the Invention

The present invention relates to a ceramic coating containing dispersion strengthened rare earth stabilized zirconia to be applied to a turbine engine component and a method for forming such a coating.

(2) Prior Art

Ceramic thermal barrier coatings have been used for decades to extend the life of combustors and high turbine stationary and rotating components. Zirconia has typically been the base ceramic. Stabilizers have been added to prevent the deleterious phase transformation to the monoclinic phase from the high temperature stable cubic or tetragonal phase. Early stabilizers such as 22 wt % magnesia were utilized, but as turbine temperatures increased beyond 1900 degrees Fahrenheit, the durability of the magnesia stabilized zirconia deteriorated since magnesia stabilized zirconia crystallographically destabilizes above 1750 degrees Fahrenheit. Compositional improvements led to a 7 wt % yttria stabilized zirconia. With this composition, thermal barrier coatings attained a good balance between durability, i.e. thermal oxidative cycling; stability, i.e. sintering and phase stability; mechanical properties, i.e. fracture toughness, erosion resistance and adherence; and thermal properties, i.e. thermal conductivity and thermal expansion.

As current engine models continue to increase temperatures and warrant decreased component weight, advanced ceramics are being pursued. A zirconia based coating, such as a gadolinia-zirconia coating as described in commonly owned U.S. Pat. No. 6,177,200 has been developed which provides a reduced thermal conductivity ceramic thermal barrier coating. However, such coating would benefit from improved mechanical properties, such as fracture toughness and erosion resistance.

SUMMARY OF THE INVENTION

It is desirable to provide a dispersion strengthened rare earth stabilized zirconia coating composition which exhibits desirable mechanical properties.

It is further desirable to provide a process for forming a coating containing the improved coating composition. In accordance with a first aspect of the present invention, a process for forming a coating on a substrate, such as a turbine engine component, is provided. The process comprises the steps of: providing a rare earth oxide stabilized zirconia composition; blending the first rare earth oxide stabilized zirconia composition with at least one additional constituent selected from the group consisting of $TiO_2$, $Al_2O_3$, a blend of $Al_2O_3$—$TiO_2$, $La_2Zr_2O_7$, and 20 wt % yttria stabilized zirconia; and depositing the blended powder onto the substrate.

In accordance with a second aspect of the present invention, an article is provided which comprises a substrate and a coating deposited on the substrate. The coating is formed from a first rare earth oxide stabilized zirconia powder blended with at least one additional constituent selected from the group consisting of $TiO_2$, $Al_2O_3$, a blend of $Al_2O_3$—$TiO_2$, $La_2Zr_2O_7$, and 20 wt % yttria stabilized zirconia.

Other details of the dispersion strengthened rare earth oxide stabilized zirconia coatings of the present invention, as well as other objects and advantages attendant thereto, are set forth in the following detailed description and the accompanying figure.

BRIEF DESCRIPTION OF THE DRAWING(S)

Figure 1:
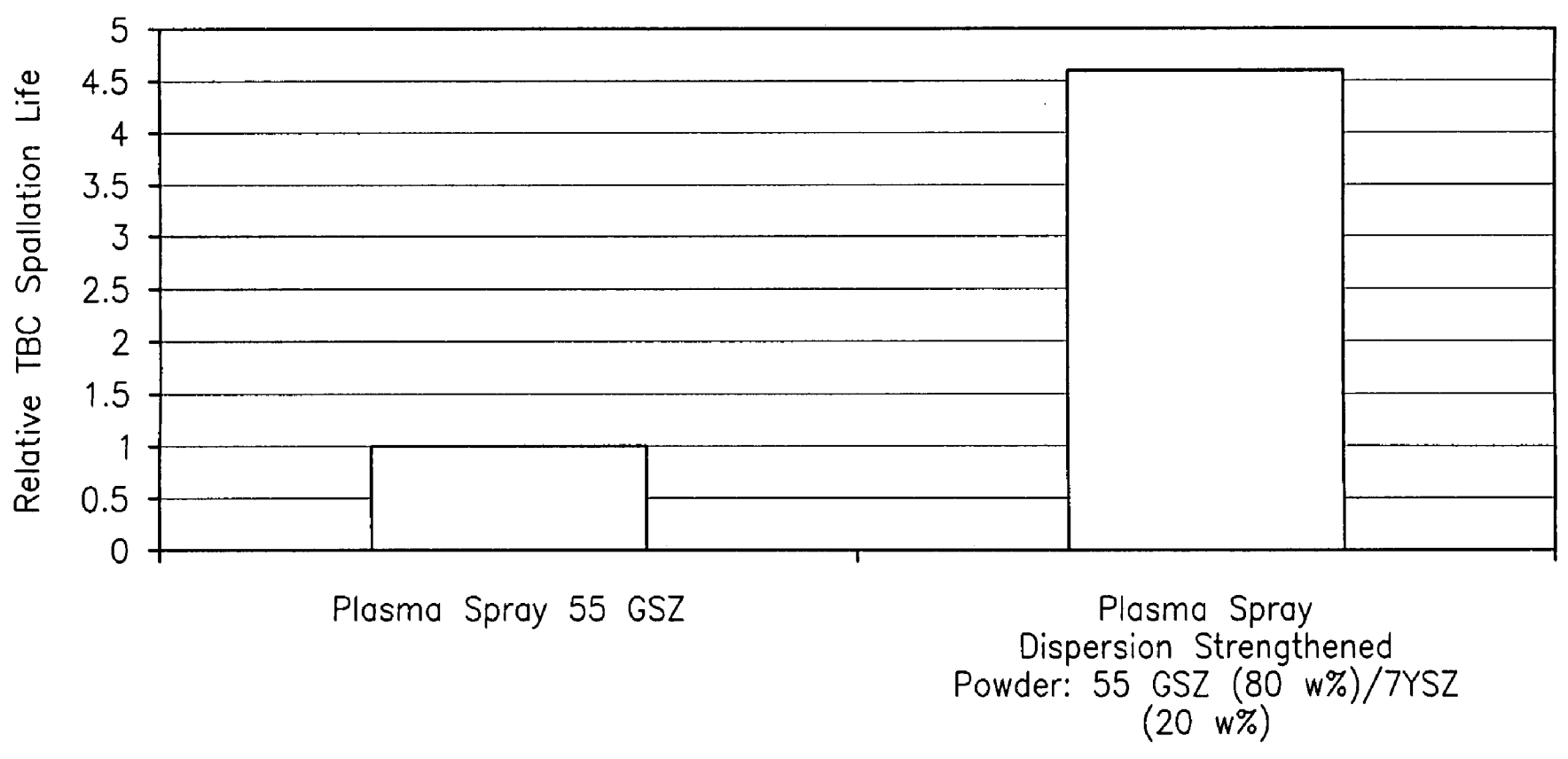

FIG. 1 shows relative thermal barrier coating spallation life for a plasma sprayed, gadolinia stabilized zirconia coating and for a plasma sprayed, dispersion strengthened powder coating having 55 wt % gadolinia stabilized zirconia and 4-25 wt % yttria stabilized zirconia, mixed in proportions of 80 wt % of the first powder with 20 wt % of the second powder; and FIG. 2 shows relative thermal barrier coating erosion life for a plasma sprayed, gadolinia stabilized zirconia coating and for a plasma sprayed, dispersion strengthened powder coating having 55 wt % gadolinia stabilized zirconia and 4-25 wt % yttria stabilized zirconia, mixed in proportions of 80 wt % of the first powder with 20 wt % of the second powder.

DETAILED DESCRIPTION OF THE PREFERRED EMBODIMENT(S)

In accordance with the present invention, a low thermal conductivity coating is provided which utilizes a dispersion strengthening mechanism. The coating includes at least two powders that are blended mechanically, alloyed, or by other means, prior to being deposited onto a substrate, such as a turbine engine component. As used herein, the term "blended" refers to blending, mixing, and/or combining the at least two powders.

The first powder used to form the coating is a composition which contains at least one rare earth oxide, such as gadolinium oxide (gadolinia), yttrium oxide (yttria), and zirconium oxide (zirconia). The rare earth oxide or oxides in the first powder are preferably present in a minimum concentration of 5.0 wt % total. When used in the first powder, gadolinia is preferably present in an amount ranging from 10.0 wt % to 80 wt %. When used in the first powder, yttria is preferably present in an amount ranging from 4.0 wt % to 25.0 wt %. When used in the first powder, zirconia represents the balance of the powder composition. The first powder may contain additional rare earth constituents including, but not limited to lanthanum oxide, cerium oxide, praseodymium oxide, neodymium oxide, promethium oxide, samarium oxide, europium oxide, terbium oxide, dysprosium oxide, holmium oxide, erbium oxide, thulium oxide, ytterbium oxide, lutetium oxide, and mixtures thereof. Other oxides which may be used in the first powder composition may include at least one of iridium oxide and scandium oxide. One or more of these oxides may be used in lieu of yttria oxide or in addition thereto. The iridium oxide and/or scandium oxide may be present in an amount ranging from 10 wt % to 80 wt %.

In a preferred embodiment, the first powder composition consists of 40 wt % gadolinia, 7 wt % yttria, and the balance zirconia.

The constituents forming this first powder are preferably mixed together during powder fabrication to produce a single phase product. Coatings produced from this powder have 50-60% of the thermal conductivity of air plasma-sprayed 7% yttria stabilized zirconia (YSZ), as well as good phase stability, improvements in fracture toughness and increase in spallation life.

The first powder is blended mechanically, alloyed, or by other means, with a second powder. The second powder may be selected from the group consisting of yttria stabilized zirconia, ceria stabilized zirconia, alumina, chromia-alumina, rare earth stabilized zirconia, titania, alumina-titania and mixtures thereof. When used to form the second powder composition, the rare earth stabilized zirconia may include at least one rare earth selected from the group consisting of lanthanum oxide, cerium oxide, praseodymium oxide, neodymium oxide, promethium oxide, samarium oxide, europium oxide, terbium oxide, dysprosium oxide, holmium oxide, erbium oxide, thulium oxide, ytterbium oxide, lutetium oxide, and mixtures thereof. The rare earth oxide(s) when used may be present in an amount from 10 to 80 wt %. For example, the second powder may be 4.0-25.0 wt % YSZ (yttria stabilized zirconia). Alternatively, the second powder may be ceria stabilized zirconia having a composition consisting of from 5.0 wt % to 60.0 wt %, preferably from 5.0 to 30.0 wt %, ceria, from 0.5 wt % to 5.0 wt % hafnia, and the balance zirconia. In a preferred embodiment, the ceria stabilized zirconia has a composition consisting of 21.4 wt % ceria, 1.5 wt % hafnia, and the balance zirconia. Still further, the second powder may have a composition consisting of from about 10.0 wt % to 80.0 wt % gadolinia, preferably 15 wt % gadolinia, and the balance zirconia. The gadolinia stabilized zirconia powder has the added benefit of being able to decrease the thermal conductivity of the coating further through increased amounts of gadolinia without sacrificing fracture toughness. In another embodiment of the present invention, the second powder may be alumina or chromia-alumina, where the chromia has a composition ranging from 5.0 to 40.0 wt % alumina with the remainder chromia.

All of the aforementioned second powders, when blended with the first powder, provide increased toughness to the coating, which translates into increased spallation life (see FIG. 1) and erosion resistance (see FIG. 2) when compared to coatings of the first powder composition alone.

In an additional embodiment, the first two powders may be mixed with a third fugitive diluent powder, such as polyester or acrylic resin (LUCITE) powder, where the fugitive diluent powder has a particle size in the range from 10.0 to 250 microns, to alter the coating microstructure in the form of increased porosity. The added fugitive diluent powder can produce coatings with a significant reduction in thermal conductivity as compared to coatings without fugitive diluent. When used, the added fugitive diluent powder may be present in an amount ranging from 1.0 wt % to 20 wt %.

Both the first and second powders each have a particle size in the range of from 5.0 to 250 microns, preferably in the range of from 10.0 microns to 125 microns.

The first and second powders are blended so that the first powder forms from 50 wt % to 90 wt % of the coating powder and the second powder forms from 10 wt % to 50 wt % of the coating powder. In a preferred embodiment, the first powder is present in the amount of 80 wt % and the second powder is present in the amount of 20 wt %.

The powders are blended together prior to deposition so as to increase the fracture toughness of the resulting coating. The final coating, made from the mix of the first and second powders, has a two phase microstructure with low thermal conductivity and equal to better spallation resistance compared to coatings made with the second powder composition alone. In the case of gadolinia stabilized zirconia mixed with a yttria stabilized powder, the microstructure has tetragonal YSZ in a cubic GSZ matrix. When two powders are used to form the coating, the final coating has the same percentage of the two powders. For example, if the coating is formed using 80 wt % of the first powder and 20 wt % of the second powder, the final coating will have 80 wt % of the first powder and 20 wt % of the second powder. The conductivity of the final coating is preferably in the range of from 2.5 to 4.5 BTU-in/hr-ft$^2$-° F. (0.36-0.65 W/m-K).

As mentioned above, the blending of the two or more powders may be a mechanical blending or be prepared by other means such as, but not limited to, plasma densification, fused and crushed, spray dried/sintered, and spray dried/plasma densified.

After the blending operation has been completed, the two powders may be deposited on a substrate using any suitable technique known in the art. For example, the powder may be plasma spray deposited on the substrate or may be applied using EB-PVD techniques. Since plasma sprayed thermal barrier coatings typically fail within the ceramic, adjacent to the bond coat interface, strengthening the ceramic as done herein will lead to improved oxidation durability lives on the order of 4-5× as shown in the figure attached hereto. The use of yttria stabilized zirconia as a strengthening agent enables higher weight percentages of the relatively weaker gadolinia zirconia system to be used to further reduce the coating thermal conductivity without detriment to coating spallation life.

Articles which can be provided with the coatings of the present invention include, but are not limited to, combustor components, high pressure turbine vanes and blades, tips, cases, nozzles, and seals.

The coatings of the present invention may be applied to any component of an engine requiring a thermal barrier coating/abradable system or a clearance control system.

An additional benefit of the low thermal conductivity of the coatings of the present invention is that the coating can be applied at lower thicknesses, thereby saving weight while maintaining equivalent thermal protection as compared to conventional coatings.

The coatings of the present invention are called dispersion strengthened coatings because they contain a dispersed second phase which improves coating toughness.

If desired, the article containing the coating of the present invention may have an additional layer deposited on the substrate, beneath the coating formed by the blended powders, i.e. as a ceramic bond coat, and/or an additional layer deposited on top of the coating. Each additional layer may have a thickness in the range of from 0.0005 to 0.009 inches and may be formed from yttria stabilized zirconia, such as 7.0 wt % yttria stabilized zirconia, alumina, chromia-alumina, silicon carbide, silicon nitride, and mixtures thereof. The additional layers may improve spallation, erosion and environmental resistance of the coating. When the additional layer is deposited over the substrate, a bond coat layer formed from any suitable material known in the art may be positioned intermediate the additional layer and the substrate.

A useful coating in accordance with the present invention is one which is formed from gadolinia, yttria, and zirconia blended with from 0.001 wt % to 50 wt %, preferably from 15 wt % to 25 wt % of at least one additional constituent in powder form. In the gadolinia, yttria, and zirconia constituent, gadolinia may be present in an amount from 10 wt % to 80 wt %, yttria may be present in an amount from 4.0 wt % to 25 wt % and the balance being zirconia. In a preferred embodiment, gadolinia may be present in an amount from 35 to 45 wt %, yttria may be present in an amount from 5 to 10 wt %, and the balance may be zirconia. Each of the constituents may be in a powder form and have a mean particle size which is in the range of from 5 to 250 microns, preferably from 10 to 125 microns. For example, one can prepare a blend of 40 wt % gadolinia, 7 wt % yttria, and 53 wt % zirconia as outlined above. After having been blended, the gadolinia, yttria, and zirconia may be blended with at least one additional constituent selected from the group consisting of $TiO_2$, $Al_2O_3$, a blend of $Al_2O_3$—$TiO_2$, $La_2Zr_2O_7$, and 20 wt % yttria stabilized zirconia. When a blend of $Al_2O_3$—$TiO_2$ is used, $TiO_2$ may be present in a range of from 5.0 to 50 wt % with the balance being $Al_2O_3$. As noted above, the additional constituent(s) may be present in an amount from 1.0 wt % to 50 wt %, preferably from about 15 wt % to 25 wt %.

By providing such a blend of powders, improvements in erosion resistance can be obtained. For example, an improvement in erosion resistance of 2-6× have been obtained for a 40 wt % gadolinia-7 wt % yttria-53 wt % zirconia powder blended with 10 wt % $TiO_2$ as compared with a coating formed solely from 40 wt % gadolinia-7 wt % yttria-53 wt % zirconia.

A coating using the foregoing constituents may be formed using any technique described hereinbefore and may be applied to any of the articles listed above.

It is apparent that there has been provided in accordance with the present invention a dispersion strengthened rare earth stabilized zirconia which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations, as fall within the broad scope of the appended claims.

What is claimed is:

1. An article comprising:
a substrate;
said substrate being an engine component;
a coating deposited on said substrate;
said coating being formed solely from a first rare earth oxide stabilized zirconia powder blended with at least one additional constituent selected from the group consisting of $TiO_2$, $Al_2O_3$, and a blend of $Al_2O_3$—$TiO_2$;
said at least one additional constituent being present in an amount from 0.001 wt % to less than 50 wt %; and
said first rare earth oxide stabilized zirconia powder consisting of a gadolinia-yttria-zirconia powder having a composition of from 10 wt % to 80 wt % gadolinia, from 4.0 wt % to 25 wt % yttria, and the balance zirconia.

2. An article according to claim 1, wherein said rare earth oxide stabilized zirconia powder comprises a powder containing 40 wt % gadolinia, 7 wt % yttria, and 53 wt % zirconia.

3. An article according to claim 1, wherein said at least one additional constituent is present in an amount from 15 wt % to 25 wt %.

4. An article according to claim 1, wherein said at least one additional constituent is only $TiO_2$.

5. An article according to claim 1, wherein said at least one additional constituent is a blend of $Al_2O_3$—$TiO_2$ in which said blend has $TiO_2$ present in an amount from 5.0 wt % to 50 wt % and the balance of the blend is $Al_2O_3$.

6. The article according to claim 1, wherein said coating has from 50 to 60% of the thermal conductivity of air plasma-sprayed 7% yttria stabilized zirconia.

7. The article according to claim 1, wherein said first rare earth oxide stabilized zirconia powder has a composition of from 35 to 45 wt % gadolinia, from 5.0 to 10 wt % yttria and the balance zirconia.

8. The article according to claim 1, wherein said at least one additional constituent is in powder form.

9. An article comprising:
a substrate;
a coating deposited on said substrate;
said coating being formed solely from a first rare earth oxide stabilized zirconia powder blended with at least one additional constituent selected from the group consisting of $La_2Zr_2O_7$, and 20 wt % yttria stabilized zirconia;
said at least one additional constituent being present in an amount from 0.001 wt % to 50 wt %; and
said first rare earth oxide stabilized zirconia powder consisting of a gadolinia-yttria-zirconia powder having a composition of from 10 wt % to 80 wt % gadolinia, from 4.0 wt % to 25 wt % yttria, and the balance zirconia,
wherein said at least one additional constituent is 20 wt % yttria stabilized zirconia and said coating has a microstructure with tetragonal yttria stabilized zirconia in a cubic gadolinia stabilized zirconia matrix.

10. The article according to claim 1, wherein said coating has a thermal conductivity in the range of from 2.5 to 4.5 BTU-in/hr-ft²-° F.

11. The article comprising:
a substrate
a coating deposited on said substrate;
said coating consisting of a first rare earth oxide stabilized zirconia powder blended with from 0.001 to less than 50 wt % of at least one additional constituent selected from the group consisting of $TiO_2$, $Al_2O_3$, and a blend of $Al_2O_3$—$TiO_2$ and a fugitive diluent powder;
said first rare earth oxide stabilized zirconia powder consisting of a gadolinia-yttria-zirconia powder having a composition of from 10 wt % to 80 wt % gadolinia, from 4.0 wt % to 25 wt % yttria, and the balance zirconia; and
said fugitive diluent powder being selected from the group consisting of polyester and acrylic resin, wherein said fugitive diluent powder has a particle size in the range of from 10 to 250 microns.

12. The article according to claim 11, wherein said fugitive diluent powder is present in an amount from 1.0 to 20 wt %.

13. An article comprising:
a substrate
a coating deposited on said substrate;
said coating being formed solely from a first rare earth oxide stabilized zirconia powder blended with from 0.001 to 50 weight percent of at least one additional constituent selected from the group consisting of $La_2Zr_2O_7$, and 20 wt % yttria stabilized zirconia; and
said first rare earth oxide stabilized zirconia powder consisting of a gadolinia-yttria-zirconia powder having a composition of from 10 wt % to 80 wt % gadolinia, from 4.0 wt % to 25 wt % yttria, and the balance zirconia and additional rare earth constituents selected from the group consisting of lanthanum oxide, cerium oxide, praseodymium oxide, neodymium oxide, promethium oxide, samarium oxide, europium oxide, terbium oxide, dysprosium oxide, holmium oxide, erbium oxide, thulium oxide, ytterbium oxide, lutetium oxide, and mixtures thereof.

14. An article comprising:
a substrate
a coating deposited on said substrate;
said coating being formed solely from a first rare earth oxide stabilized zirconia powder blended with from 0.001 to 50 wt % of at least one additional constituent selected from the group consisting of $La_2Zr_2O_7$, and 20 wt % yttria stabilized zirconia; and said first rare earth oxide stabilized zirconia powder consisting of a gadolinia-yttria-zirconia powder having a composition of from 10 wt % to 80 wt % gadolinia, from 4.0 wt % to 25 wt % yttria, and the balance zirconia and at least one of iridium oxide and scandium oxide.

15. The article comprising:

a substrate a coating deposited on said substrate;

said coating consisting of a first rare earth oxide stabilized zirconia powder blended with from 0.001 to 50 wt % of at least one additional constituent selected from the group consisting of $La_2Zr_2O_7$, and 20 wt % yttria stabilized zirconia and a fugitive diluent powder;

said first rare earth oxide stabilized zirconia powder consisting of a gadolinia-yttria-zirconia powder having a composition of from 10 wt % to 80 wt % gadolinia, from 4.0 wt % to 25 wt % yttria, and the balance zirconia; and said fugitive diluent powder being selected from the group consisting of polyester and acrylic resin, wherein said fugitive diluent powder has a particle size in the range of from 10 to 250 microns.

* * * * *